United States Patent Office 2,870,033
Patented Jan. 20, 1959

2,870,033

ADHESIVE COMPOSITIONS

James G. Lander, Cincinnati, Ohio, assignor to Diamond Alkali Company, Cleveland, Ohio, a corporation of Delaware No Drawing. Application March 19, 1954
Serial No. 417,507

11 Claims. (Cl. 106—82)

This invention relates to a composition of matter comprising aqueous adhesive silicate glass, which composition is characterized by high adhesiveness to cellulose-containing materials, such as paper surfaces employed in laminated paper articles, but which is also characterized by lack of adhesion to heated metal surfaces. It relates also to the method of preparing boxboard which includes use of the new composition.

One of the steps of a typical paper laminating operation involves the pressing of the composite sheet after the adhesive has been applied to the plies and such plies have been arranged in laminated relationship. Generally, in the manufacture of corrugated paperboard, this operation is conducted by passing an advancing laminated web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed between a corrugating roll and a pressure roll under sufficient pressure to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and is deposited upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the change-over from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

It is now known that by the addition of urea to an otherwise suitable silicate adhesive composition, the problem that is present as indicated above no longer exists, for, thereby an adhesive is produced which is as effective as the unmodified silicate adhesive insofar as securing the laminates is concerned and which is substantially self-releasing from the heated metal surfaces. The quantity of urea that has been suggested for addition to the silicate adhesive has been indicated as being about 8 to 15% of the adhesive mixture. Other quantities may be added but better results seem to be produced by the stated percentages.

As urea is an expensive additive, it is desirable to maintain the quantity that is added as low as possible without losing the desired self-releasing function. At the same time it is desirable to produce an adhesive having a high degree of moisture resistance as high humidity conditions may deleteriously affect a bond that is otherwise strong.

In such known silicate compositions, it is customary to include various other ingredients, some of which have been for the purposes of decreasing the quantity of urea required for good results. Also, the preferred formulations of these compositions have included a substantial quantity of water, for example, about 14–20%, and in some cases, up to about 30%, the water being required for good initial dispersion of the additives in the silicate. However, in order for the adhesive to finally set when applied to surfaces that are to be bonded together, a substantial quantity of the added water must be removed. As noted above, this is accomplished as the surfaces to which the adhesive is applied are passed thru the forming equipment which, for this purpose, is heated to, for example, about 330° F. for a paper web moving at 300–500 feet per minute, generally about 350 feet per minute. This temperature, or a temperature only slightly higher, is preferred, since higher temperatures cause the adhesive to set up too quickly as a result of which the final bond is excessively brittle. The difficulty of brittleness is not remedied by increasing the web speed because the preferred setting action is not simply a matter of time and temperature.

Accordingly, since the temperature is necessarily rather firmly fixed, it is necessary, in order to effect the required degree of dehydration of compositions containing large amounts of water, to reduce production speed so that a longer time is provided in which the excess water can be removed, thus permitting setting action to proceed under the proper temperature. Reducing production rate is obviously undesirable; the rate must be maintain to prevent an upsurge in costs. It is therefore apparent that the composition must be modified to include a smaller quantity of water. The present invention is, among other things, directed to this problem.

An object of the present invention is to provide a composition and method for decreasing the adhesion of an adhesive silicate glass composition to heated metal surfaces generally.

Another object of the invention is to provide a method and composition for preventing the adhesion of aqueous adhesive silicate glasses commonly employed in the paper laminating industry to the heated metal surfaces of the platens used for form laminates.

A further object of this invention is to produce a self-releasing adhesive requiring a low percentage of urea and which at the same time has good resistance to high humidity conditions.

A still further object of this invention is to provide a composition having the foregoing advantage which employs a reduced quantity of water and therefore, one which does not require an increase of residence time in processing equipment to effect suitable dehydration.

These and other objects will occur to those skilled in the art from the description of the invention set forth below.

The present invention contemplates the combination of a major proportion of aqueous silicate solution of materials which, while they do not interfere with the ultimate adhesiveness of the dehydrated adhesive silicate glass, nevertheless provide properties of non-adhesiveness to the heated metallic surfaces which come in contact with the composition, especially parts of boxboard manufacturing equipment, and which have excellent resistance to high humidity and improved properties respecting dehydration while in process.

It has been found, according to this invention, that by including a small quantity of a fatty oil in the well known adhesive silicate compositions described above, the quantities of urea and water which are ordinarily required for best results, may be reduced considerably whereby, the cost of the composition is reduced and the speed of forming equipment wherein the composition is utilized may be maintained at a preferred level. These improvements are achieved in the known compositions without detriment to their other desirable properties.

The compositions of the invention include, in addition to the adhesive sodium silicate solution, suitable quantities of urea, which may be ordinary technical grade, a fatty oil, which may suitably be a crude, unrefined oil, alkali metal chromate or bichromate, suitably sodium bichromate, a finely divided clay, which may be any predominantly aluminum silicate material of sufficient fineness, i. e., of the order of the average particle size of a few microns diameter, and of which Barden clay is satisfactory, and water. Other materials commonly added to silicate adhesives may also be included in the compositions of this invention in their usual quantities, such as magnesium sulfate, a sugar, for example, tanner's sugar, blackstrap molasses and the like, without detriment and with their usual effects.

The fatty oil may be any suitable oil, either animal or vegetable. Drying oils such as linseed, cottonseed, menhaden and soybean are especially suitable and their cost is not prohibitive. Also, other suitable exemplary oils are lard, corn, kopack, sesame and the like.

While the relative proportions of the materials in the composition of the invention are not highly critical, it has been found that suitable compositions, in the sense of high adhesiveness to boxboard structures and low adhesiveness to heated surfaces of boxboard machines, the latter being sufficiently low so that a moving web of paper may dislodge deposits without damage to the paper, and in the sense that good setting properties are attained without loss in standard production speed, comprise between about 60–85%, preferably about 75–80% of aqueous silicate glass solution containing 35–45% solids and averaging on the weight basis 1 part of $Na_2O$ to between 2.5 and 4 parts of $SiO_2$, and suitably within the range of $1Na_2O$ to $3-3.5SiO_2$, preferably of about $1Na_2O$ to 3.3 parts of $SiO_2$, and which may suitably contain a small amount of an anionic wetting agent, of which aromatic monosodium sulfonate derived from petroleum oil, alkyl aryl sulfonates, coconut oil sulfonates, and the like are examples, an exemplary quantity being about 1%, between 2 and 10% of urea, preferably about 3–6%, of urea, between 0.1 and 3% fatty oil, preferably about 0.3–1%, between 0.1 and 1% alkali metal bichromate and about 3–10% water, preferably about 5–6%. Other materials such as sugars, magnesium sulfate, clays, in amounts, respectively up to about 5%, 3% and 20%, may be included in the compositions to adopt them as may be desired in specific instances.

No criticality lies in the manner of combining these ingredients but it has been found convenient first to supply the silicate, which may contain the wetting agent, to a mixing chamber, next add and mix the oil, and then add the urea, clay, water, and any other desired ingredients, as a water-mixture. The formulation is then thoroughly mixed.

The method of the invention may suitably be carried out by employing a composition prepared as described above in a known type of boxboard or other laminated paper manufacturing machine and in a manner entirely equivalent to that used for ordinary untreated silicate adhesive.

In order that those skilled in the art may have further understanding of the invention and its preferred mode of practice, the following specific exemplary compositions are provided:

*Example I*

| | Percent by weight |
|---|---|
| Sodium silicate solution (40.8° Bé.) 37.7–8% solids ($Na_2O:SiO_2$ ratio, 1:3.3) | 77.0 |
| Urea | 4.5 |
| Crude cottonseed oil | 0.5 |
| Sodium bichromate | 0.3 |
| Barden clay | 12.0 |
| Water | 5.7 |
| | 100.0 |

This composition provides good bonding strength and resistance to humidity. It has excellent releasing properties when it is deposited on the heated platens in that it is easily brushed off by the moving webs or it may be dusted off by light hand contact. Its dehydration time is outstanding, the setting action in, for example, boxboard forming equipment being accomplished in about twenty seconds.

*Example II*

A composition is prepared identical with Example I except that 5.5% water is employed and 0.2% alkyl aryl sodium sulfonate is added as a wetting agent. The composition is not affected detrimentally by the wetting agent and the oil is slightly more readily dispersed in the mixture. Its properties are substantially the same as those of Example I.

*Example III*

| | Percent by weight |
|---|---|
| Sodium silicate solution (40.8° Bé.) 37.7–8% solids ($Na_2O:SiO_2$ ratio, 1:3.3) | 77.0 |
| Urea | 4.5 |
| Crude degummed soybean oil | 0.5 |
| Sodium bichromate | 0.3 |
| Barden clay | 12.0 |
| Water | 5.7 |
| | 100.0 |

This composition is almost identical in properties with those of the foregoing examples except that setting time is improved to about 19.3 seconds.

Example IV

| | Percent by weight |
|---|---|
| Sodium silicate solution (40.8° Bé.) 37.7–8% solids ($Na_2O:SiO_2$ ratio, 1:3.3) | 76.0 |
| Alkyl aryl sodium sulfonate | 0.3 |
| Crude menhaden oil | 0.8 |
| Urea | 5.0 |
| Sodium bichromate | 0.3 |
| Suprex clay | 10.6 |
| Water | 7.0 |
| | 100.0 |

Properties of this mixture are substantially identical with those of the foregoing examples.

Example V

| | Percent by weight |
|---|---|
| Sodium silicate solution (40.8° Bé.) 37.7–8% solids ($Na_2O:SiO_2$ ratio, 1:3.3) | 76.8 |
| Urea | 3.5 |
| Boiled linseed oil | 1.0 |
| Magnesium sulfate | 1.4 |
| Sodium bichromate | 0.3 |
| Barden clay | 7.0 |
| Water | 10.0 |
| | 100.0 |

The properties of this mixture are substantially the same as those of the foregoing examples except that dehydration time is a little longer. When water content in this formulation is reduced to about 6%, an excellent composition is provided.

It is obvious that beneficial effects may be derived from the invention in any case where low dehydration time is important but where the difficulty of the adhesive adhering to metal surfaces is not encountered. Thus, suitable compositions with greatly reduced water content may be provided excluding urea entirely and containing the fatty oils of the invention herein. It will be understood that such compositions are within the scope of the invention.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An adhesive silicate composition characterized by strong adherence to cellulosic materials and substantial non-adherence to heated metal surfaces, said composition consisting of a major proportion of an aqueous adhesive silicate solution having a solids content of 35–45% and an $Na_2O:SiO_2$ ratio of 1:2.5–4 and including in the minor proportion, about 3 to 10% urea, and about 0.1 to 3% of a fatty oil, sufficient in amount to impart non-adherence of said adhesive silicate glass to heated metal surfaces.

2. A composition of matter consisting essentially of:

| | Approx. percent by weight |
|---|---|
| Aqueous silicate glass solution ($Na_2O:SiO_2$ ratio, 1:2.5–4, 35–45% solids) | 60–85 |
| Urea | 3–10 |
| Fatty oil | 0.1–3 |
| Clay | 5–20 |
| Water | 3–10 |

3. A composition of matter as claimed in claim 2 wherein the said fatty oil is cottonseed oil.

4. A composition of matter as claimed in claim 2 wherein the said fatty oil is soybean oil.

5. A composition of matter as claimed in claim 2 wherein the said fatty oil is menhaden oil.

6. A composition of matter as claimed in claim 2 wherein the said oil is linseed oil.

7. A composition of matter consisting essentially of:

| | Approx. percent by weight |
|---|---|
| Sodium silicate solution (40.8° Bé.) 37.7–8% solids $Na_2O:SiO_2$ ratio, 1:3.3 | 60–85 |
| Urea | 3–10 |
| Fatty oil | 0.1–3 |
| Clay | 5–20 |
| Water | 3–10 |

8. A composition of matter consisting of:

| | Approx. percent by weight |
|---|---|
| Sodium silicate solution (40.8° Bé.) 37.7–8% solids ($Na_2O:SiO_2$ ratio, 1:3.3) | 77.0 |
| Urea | 4.5 |
| Cottonseed oil | 0.5 |
| Sodium bichromate | 0.3 |
| Barden clay | 12.0 |
| Water | 5.7 |

9. A composition of matter consisting of:

| | Approx. percent by weight |
|---|---|
| Sodium silicate solution (40.8° Bé.) 37.7–8% solids ($Na_2O:SiO_2$ ratio, 1:3.3) | 77.0 |
| Urea | 4.5 |
| Soybean oil | 0.5 |
| Sodium bichromate | 0.3 |
| Barden clay | 12.0 |
| Water | 5.7 |

10. A composition of matter consisting of:

| | Approx. percent by weight |
|---|---|
| Sodium silicate solution (40.8° Bé.) 37.7–8% solids ($Na_2O:SiO_2$ ratio, 1:3.3) | 76.0 |
| Alkyl aryl sodium sulfonate | 0.3 |
| Menhaden oil | 0.8 |
| Urea | 5.0 |
| Sodium bichromate | 0.3 |
| Clay | 10.6 |
| Water | 7.0 |

11. A composition of matter consisting of:

| | Approx. percent by weight |
|---|---|
| Sodium silicate solution (40.8° Bé.) 37.7–8% solids ($Na_2O:SiO_2$ ratio, 1:3.3) | 76.8 |
| Urea | 3.5 |
| Linseed oil | 1.0 |
| Magnesium sulfate | 1.4 |
| Sodium bichromate | 0.3 |
| Barden clay | 7.0 |
| Water | 10.0 |

References Cited in the file of this patent

UNITED STATES PATENTS

| | | |
|---|---|---|
| 336,569 | Jordan | Feb. 3, 1886 |
| 2,434,466 | Marc | Jan. 13, 1948 |
| 2,457,108 | Baker et al. | Dec. 28, 1948 |
| 2,533,118 | Kahn | Dec. 5, 1950 |
| 2,671,747 | Lander | Mar. 9, 1954 |